(12) United States Patent
Zlotnik et al.

(10) Patent No.: US 12,259,812 B2
(45) Date of Patent: Mar. 25, 2025

(54) CENTER ALLOCATION DATA STRUCTURE

(71) Applicant: Micron Technology, Inc., Boise, ID (US)

(72) Inventors: Leon Zlotnik, Camino, CA (US); Brian Toronyi, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 95 days.

(21) Appl. No.: 17/867,375

(22) Filed: Jul. 18, 2022

(65) Prior Publication Data

US 2024/0020223 A1    Jan. 18, 2024

(51) Int. Cl.
G06F 12/02      (2006.01)
G06F 9/50       (2006.01)

(52) U.S. Cl.
CPC ......... G06F 12/023 (2013.01); G06F 9/5016 (2013.01); *G06F 12/0292* (2013.01)

(58) Field of Classification Search
None
See application file for complete search history.

(56) References Cited

U.S. PATENT DOCUMENTS

| | | | |
|---|---|---|---|
| 7,640,262 B1 * | 12/2009 | Beaverson | G06F 16/2246 711/111 |
| 8,966,155 B1 | 2/2015 | Mulligan | |
| 10,915,475 B2 | 2/2021 | Dubey et al. | |
| 2003/0145187 A1 * | 7/2003 | Hudson | H04L 49/9073 711/202 |
| 2004/0073763 A1 * | 4/2004 | Dageville | G06F 9/5016 711/170 |
| 2007/0260614 A1 * | 11/2007 | Bray | G06F 16/235 |
| 2009/0259805 A1 | 10/2009 | Kilzer et al. | |
| 2011/0161565 A1 * | 6/2011 | Chua | G06F 12/0246 711/E12.001 |
| 2012/0215965 A1 * | 8/2012 | Inada | G06F 12/0246 711/E12.017 |
| 2013/0111116 A1 * | 5/2013 | Inada | G06F 12/0246 711/E12.008 |
| 2014/0032992 A1 * | 1/2014 | Hara | G06F 11/1072 714/773 |
| 2014/0143631 A1 * | 5/2014 | Varanasi | G11C 11/5628 714/763 |
| 2023/0065300 A1 * | 3/2023 | Labat | G06F 3/0604 |
| 2023/0087010 A1 * | 3/2023 | Yamada | G06F 3/0679 711/154 |

* cited by examiner

*Primary Examiner* — Charles Rones
*Assistant Examiner* — Ryan Dare
(74) *Attorney, Agent, or Firm* — Brooks, Cameron & Huebsch, PLLC

(57) ABSTRACT

A first data entry is written to an address location of a memory resource that is neither a first physical address nor a last physical address. In response to a determination that a second data entry has a value that is greater than a value associated with the first data entry, the second data entry is written to an address location that is physically located between the address location of the memory resource to which the first data entry is written and the last physical address. In response to a determination that the second data entry has the value that is less than the value associated with the first data entry, the second data entry is written to an address location that is physically located between the address location of the memory resource to which the first data entry is written and the first physical address.

23 Claims, 10 Drawing Sheets

CENTER ALLOCATION DATA STRUCTURE

TECHNICAL FIELD

Embodiments of the disclosure relate generally to digital logic circuits, and more specifically, relate to a center allocation data structure.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
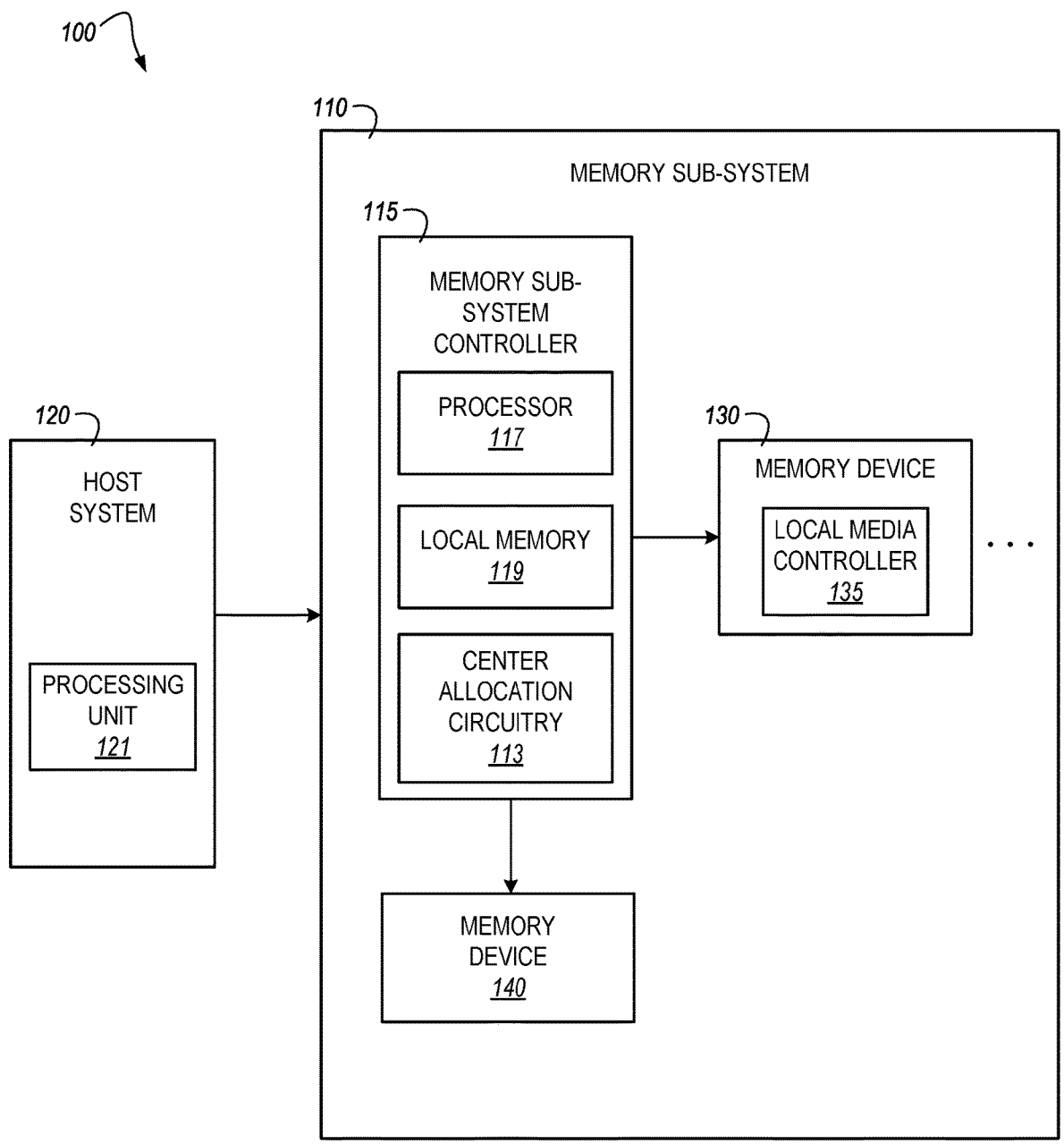
FIG. 1 illustrates an example computing system that includes a memory sub-system in accordance with some embodiments of the present disclosure.

Aspects of the present disclosure are directed to a center allocation data structure and, in particular to memory sub-systems that include a center allocation data structure component which is also referred to as "center allocation circuitry," herein. The center allocation data structure can be stored within one or more memory resources that are associated with the memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation, data is written to, and retrieved from the memory sub-system. Some data are written to persistent memory devices within the memory sub-system for long-term storage, while other data are written to non-persistent memory devices within the memory sub-system for quick, short-term retrieval. Still other data are written to various memory resources and/or caches of the memory sub-system to assist with performance of operations involving the memory sub-system. For example, various memory resources and/or caches can be utilized during operation of the memory sub-system to provide read caching, write-through caching, write-back caching, and/or write-around caching. In addition, some memory resources and/or caches of the memory sub-system can be allocated to store various tables that are utilized during operation of the memory sub-system. One such example is a logical-to-physical (L2P) table that is used to map logical addresses utilized by a host system to physical addresses of the memory sub-system where data is physically stored. Another such example is a database containing an organized collection of data that is stored within the memory resource and/or cache.

In conventional approaches, when data is written to such memory resources and/or caches, the data is generally written sequentially (e.g., in an ascending or descending order) to physical addresses of the memory resource and/or cache in the order in which the data is received. For example, if a vector of data entries [51, 7, 300, 12, 3] is to be written to a memory resource and/or cache, the first data entry (51) is generally written to a first physical address (or "zeroth address location") of the memory resource and/or cache in the event that the data is ordered in an ascending manner. When the second data entry (7) is written to the memory resource and/or cache, the first data entry (51) is shifted to a second physical address (or "first address location") of the memory resource and/or cache, and the second data entry (7) can be written to the first physical address (or "zeroth address location") of the memory resource and/or cache. When the third data entry (300) is written to the memory resource and/or cache, the first data entry (51) can be shifted to a third physical address (or "second address location") of the memory resource and/or cache, the second data entry (7) can be shifted to the second physical address (or "first address location") of the memory resource and/or cache, and the third data entry (300) can be written to the first physical address (or "zeroth address location") of the memory resource and/or cache. This pattern may be repeated for the remaining data entries (e.g., the fourth data entry (12) and the fifth data entry (7), in this particular example).

It is noted that the above example is utilized in approaches in which the data is not required to be ordered. In conventional approaches in which the data is ordered as it is written to the memory resource and/or cache, the following example is illustrative. Considering the same vector of data entries [51, 7, 300, 12, 3], the first data entry (51) is generally written to a first physical address (or "zeroth address location") of the memory resource and/or cache. When the second data entry (7) is written to the memory resource and/or cache, the first data entry (51) can be shifted to a second physical address (or "first address location") of the memory resource and/or cache, and the second data entry (7) can be written to the first physical address (or "zeroth address location") of the memory resource and/or cache.

Continuing with this example, because the third data entry (300) is larger (e.g., has a greater numerical value) than the first data entry and the second data entry, the third data entry is written to the third physical address (or "second address location") of the memory resource and/or cache. Now, the fourth data entry (12) is less (e.g., has a lower numerical value) than the first data entry (51) and the third data entry (300) but is larger than the second data entry (7), the first data entry (51) and the third data entry (300) are shifted to a third physical address (or "second address location") and a fourth physical address (or "third address location"), respectively, and the fourth data entry (12) is written to the second physical address (or "first address location") of the memory resource and/or cache. Finally, because the fifth data entry (3) is less than the first through fourth data entries, each of the first data entry through the fourth data entry are shifted one address location up (e.g., the third data entry (300) is shifted to a fifth physical address (or "fourth address location"), the first data value (51) is shifted to the fourth physical address (or "third address location"), the fourth data value (12) is shifted to the third physical address (or "second address location"), and the second data value (7) is shifted to the second physical address (or "first address location). Finally, the fifth data value (3) is written to the first physical address (or "zeroth address location). Accordingly, a final order of the data entries in this approach is allocated such that the data entries are organized in an ascending order. It will be appreciated that the final order of the data entries in this approach can be organized in a descending order using similar operations to those described above.

As will be appreciated, the repeated shifts in the above examples require multiple writes, overwrites, and rewrites of the data entries to maintain the data entries in a data structure within the memory resource(s) and/or cache(s), particularly when the data entries are maintained in an ordered (e.g., ascending or descending order based on the numerical values of the data entries) manner. These shifts and hence the reads and writes of the data entries can become costly in terms of computing resource overhead (e.g., power, time, bandwidth, etc.) and can therefore reduce the overall performance of a computing system in which such methodologies are employed.

Aspects of the present disclosure address the above and other deficiencies by writing data to a center allocation data structure in a memory resource and/or cache. In the interest of clarity, embodiments herein will be generally described in relation to writing data to a center allocation data structure in a memory resource, however, it will be appreciated that embodiments in which a cache is utilized are contemplated within the scope of the disclosure.

As will be described in more detail herein, a center allocation data structure is a data structure and/or technique for writing data to a data structure in which the first data entry is written to an address location in the memory resource that is neither a first physical address (e.g., a "zeroth address location) of the memory resource nor a last physical address (e.g., an $N^{th}$ address location, where N is the total quantity of address locations in the memory resource) of the memory resource. In some embodiments, the first data entry can be written to an address location that is substantially physically equidistant from the first physical address of the memory resource and the last physical address of the memory resource. That is, in some embodiments, the first data entry can be written to an address location that is in the middle of the memory resource with respect to the physical address spaces of the memory resource.

As used herein, the term "substantially" intends that the characteristic need not be absolute but is close enough so as to achieve the advantages of the characteristic. For example, "substantially equidistant" is not limited to a condition in which the address location that is substantially equidistant from the first physical address of the memory resource and the last physical address of the memory resource is absolutely equidistant from the first physical address of the memory resource and the last physical address of the memory resource but is equidistant from the first physical address of the memory resource and the last physical address of the memory resource within manufacturing limitations, operational conditions, etc. to achieve the characteristics of being "equidistant" from the first physical address of the memory resource and the last physical address of the memory resource. For example, if there are an even number of physical address locations in the memory resource, a physical address location that is substantially equidistant from the first physical address of the memory resource and the last physical address of the memory resource may not be at the exact physical center of the physical address locations but may be substantially equidistant such that components of the apparatus function as if said characteristics are the same or equal. It is further contemplated, however, that such characteristics may be exactly the same or exactly equal given the context of the disclosure.

In order to maintain an ordered (ascending) data structure in the memory resource, a second data entry can be written to an address location in the memory resource that is between the first physical address and the address at which the first data entry is written to if the second data entry has a value that is less than the value of the first data entry or the second data entry can be written to an address location in the memory resource that is between the last physical address and the address at which the first data entry is written to if the second data entry has a value that is greater than the value of the first data entry. It will be appreciated that, in order to maintain an ordered (descending) data structure in the memory resource, the second data entry can be written to an address location in the memory resource that is between the first physical address and the address at which the first data entry is written to if the second data entry has a value that is greater than the value of the first data entry or the second data entry can be written to an address location in the memory resource that is between the last physical address and the address and the address at which the first data entry is written to if the second data entry has a value that is less than the value of the first data entry.

Stated alternatively, and as described in more detail herein, when subsequent data entries have values that are less than the values of previous entries, they are, for an ordered ascending data structure, written to addresses that are closer to the first physical address location in the memory device. Conversely, when subsequent data entries have values that are greater than the values of previous entries, they are, for an ordered ascending data structure, written to address that are closer to the last physical address location in the memory device. For an ordered descending data structure, when subsequent data entries have values that are less than the values of previous entries, they are written to address that are closer to the last physical address location in the memory device and when subsequent data entries have values that are greater than the values of previous entries, they are written to address that are closer to the first physical address location in the memory device.

In order to continue to maintain an ordered (ascending) data structure in the memory resource, a third data entry can be written to an address location in the memory resource that is between the address at which the second data value is written to and the first physical address of the memory resource if the third data entry has a value that is less than the value of the second data entry. If the value of the third data entry is between the value of the first data entry and the second data entry, the third data entry can be written to an address location that is between the address at which the first data value is written to and the address location at which the second data value is written to. If the third data entry has a value that is greater than the first data entry and the second data entry, the third data entry can be written to an address location in the memory resource that is between the last physical address and the address and the address at which the first data entry is written to. It will be appreciated that, in order to maintain an ordered (descending) data structure in the memory resource, the third data entry can be written to an address location in the memory resource that is between the first physical address and the address at which the second data entry is written to if the third data entry has a value that is greater than the value of the second data entry and the value of the first data entry and so on and so forth.

In some embodiments, the second data entry and/or the third data entry can be written to an address location that is immediately next to the address location at which the first data entry is written; however, embodiments are not so limited, and the second data entry and/or the third data entry can be written to any address location that is between the first physical address and the address at which the first data entry is written to or between the last physical address and the address at which the first data entry is written to.

As described in more detail herein, as the data structure is filled with data entries, each subsequent data entry can be written to the data structure in an address location based on the relative value of each data entry with respect to the values of previously written data entries. This can allow for a quantity of shift operations to keep the data structured in an ordered state to be reduced in comparison to the conventional approaches described above. Accordingly, by writing the data entries to the center allocation data structure in accordance with the present disclosure, performance (e.g., the overall functioning) of a computing system in which embodiments of the present disclosure operate can be improved in comparison to the conventional approaches described above at least because the quantity of costly shift operations required to maintain the data entries in the data structure can be reduced in comparison to such approaches.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include center allocation circuitry 113. Although not shown in FIG. 1 so as to not obfuscate the drawings, the center allocation circuitry 113 can include various circuitry to facilitate aspects of the disclosure described herein. In some embodiments, the center allocation circuitry 113 can include special purpose circuitry in the form of an ASIC, FPGA, state machine, hardware processing device, and/or other logic circuitry that can allow the center allocation circuitry 113 to orchestrate and/or perform operations to write data (e.g., data entries) to a center allocation data structure of a memory resource in accordance with the disclosure.

In some embodiments, the memory sub-system controller 115 includes at least a portion of the center allocation circuitry 113. For example, the memory sub-system controller 115 can include a processor 117 (processing device) configured to execute instructions stored in local memory 119 for performing the operations described herein. In some embodiments, the center allocation circuitry 113 is part of the host system 110, an application, or an operating system. The center allocation circuitry 113 can be resident on the memory sub-system 110 and/or the memory sub-system controller 115. As used herein, the term "resident on" refers to something that is physically located on a particular component. For example, the center allocation circuitry 113 being "resident on" the memory sub-system 110, for example, refers to a condition in which the hardware circuitry that comprises the center allocation circuitry 113 is physically located on the memory sub-system 110. The term "resident on" may be used interchangeably with other terms such as "deployed on" or "located on," herein.

Figure 2:
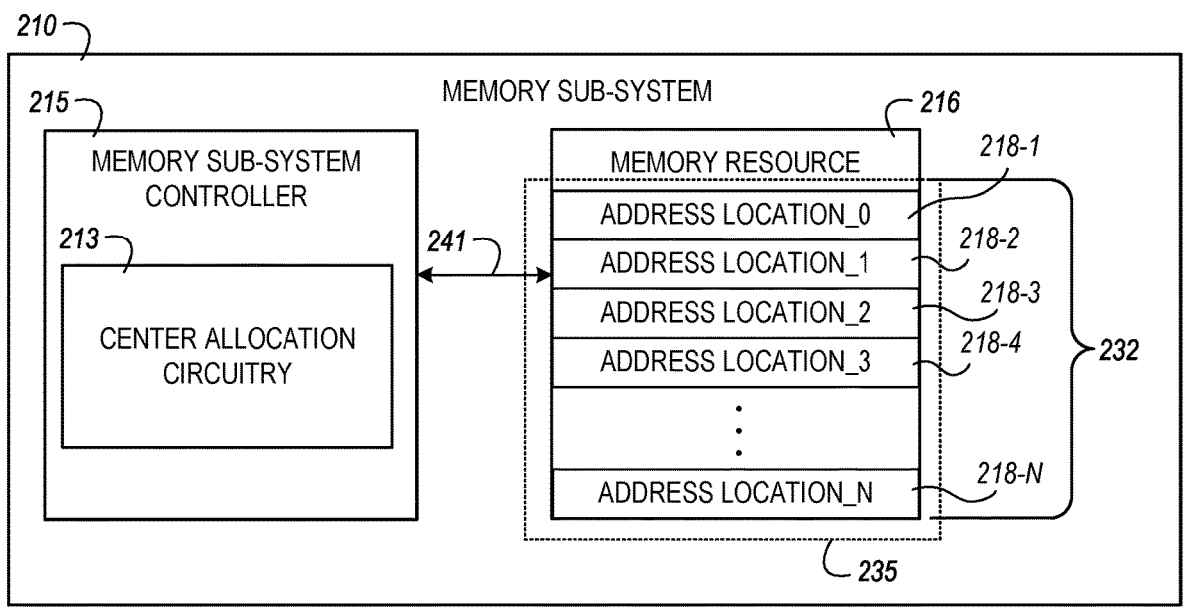
FIG. 2 illustrates an example memory sub-system in accordance with some embodiments of the present disclosure.

FIG. 2 illustrates an example memory sub-system 210 in accordance with some embodiments of the present disclosure. The example system, which can be referred to in the alternative as an "apparatus," includes a memory sub-system controller 215 and control circuitry 213, which can be analogous to the memory sub-system controller 115 and the center allocation circuitry 113 illustrated in FIG. 1, herein. The memory sub-system 210 further includes a memory resource 216 that includes a plurality of address locations 218-1, 218-2, 218-3, 218-4 to 218-N (collectively referred to hereinafter as "address locations 218") that collectively form an address space 231 of the memory resource 216.

The address locations 218 can be physical address locations that correspond to one or more memory cells of the memory resource 216. In some embodiments, two hundred and fifty-six (256) address locations 218, five hundred and twelve (512) address locations 218, etc. can be provided within the memory resource 216. It will be appreciated, however, that the memory resource 216 can include greater than or less than these enumerated quantities of address locations 216 based on the size, memory density, and/or architecture, among other factors of the memory resource 216 and/or the memory sub-system 210. In some embodiments, the address locations 218 are logically addressable, for example, by the host system 120 illustrated in FIG. 1, herein.

The address locations 218 can be configured to store data entries in a data structure 232 (e.g., a center allocation data structure). As used herein, a "data structure" refers to a specialized format for organizing and/or storing data, which may or may not be organized in rows and columns. Examples of data structures include arrays, files, records, tables, trees, linked lists, hash tables, etc. In some embodiments, the data structure 232 can be configured to store a logical-to-physical (L2P) mapping table, although embodiments are not limited to this particular example.

The ADDRESS LOCATION_0 218-1 can be referred to as a "first physical address," a "zeroth address location," or a "lowermost physical location" of the memory resource 216, herein. The ADDRESS LOCATION N 218-N can be referred to as a "last physical address," an "$N^{th}$ address location," or an "uppermost physical location" of the memory resource 216, herein.

As shown in FIG. 2, the memory resource 216 is resident on the memory sub-system 210. In the example of FIG. 2, the memory resource 216 can be resident on the memory sub-system 210 and not resident on any other component of the memory sub-system. Embodiments are not so limited and although not explicitly illustrated so as to not obfuscate the drawing layout, the memory resource 216 can be resident (or partially-resident) on any component of the memory sub-system 210. For example, the memory sub-system 210 can be resident on the memory sub-system controller 215, the control circuitry 213, the memory device 130, the local media controller 135, and/or the memory device 140 illustrated in FIG. 1.

In a non-limiting example, an apparatus (e.g., the memory sub-system 210) includes a memory resource 216 and a processing device (e.g., the center allocation circuitry 213). The apparatus can be a system-on-chip, although embodiments are not so limited. The processing device can write a first data entry to an address location 218 of the memory resource 216 that is neither a first physical address 218-1 of the memory resource nor a last physical address 218-N of the memory resource 216. In some embodiments, the processing device is configured to write the first data entry to the address location 218 of the memory resource 216 that is neither the first physical address 218-1 of the memory resource 216 nor the last physical address 218-N of the memory resource 216 by writing the data entry to an address location 218 of the memory resource that is substantially physically equidistant from the first physical address 218-1 of the memory resource 216 and the last physical address 218-N of the memory resource 216.

As described in more detail, herein, the memory resource 216 can include N address locations and (1) the first physical address 218-1 is a zeroth address location of the memory resource 216 and the last address location 218-N is an $N^{th}$ address location of the memory resource 216 or (2) the first physical address 218-1 is the $N^{th}$ address location of the memory resource 216 and the last address location 218-N is the zeroth address location of the memory resource 216. In addition, in some embodiments, the memory resource is configured to store the data entries in a data structure 232. In some embodiments, the data entries comprise logical-to-physical mapping entries associated with a memory sub-system 210 in which the memory resource 216 is deployed.

The processing device can determine whether a second data entry to be written to the memory resource 216 has a value that is greater than a value associated with the first data entry or a value that is less than the value associated with the first data entry. The processing device can then (1) in response to a determination that the second data entry has the value that is greater than a value associated with the first data entry, write the second data entry to an address location of the memory resource that is physically located between the address location of the memory resource to which the first data entry is written and the last physical address of the memory resource or (2) in response to a determination that the second data entry has the value that is less than the value associated with the first data entry, write the second data entry to an address location of the memory resource that is physically located between the address location of the memory resource to which the first data entry is written and the first physical address of the memory resource.

In some embodiments, the processing device can determine whether a third data entry to be written to the memory resource 216 (1) has a value that is greater than a value associated with the first data entry or a value that is less than the value associated with the first data entry or (2) has a value that is greater than the value associated with the second data entry or a value that is less than the value associated with the second data entry. In response to a determination that the third data entry has the value that is greater than a value associated with the first data entry and the value that is greater than the second data entry, the processing resource can write the third data entry to an address location 218 of the memory resource 216 that is physically located between the address location of the memory resource to which the second data entry is written and the last physical address of the memory resource 216. Conversely, in response to a determination that the third data entry has the value that is less than the value associated with the first data entry and the value that is less than the second data entry, the processing device can write the third data entry to an address location 218 of the memory resource 216 that is physically located between the address location of the memory resource to which the first data entry is written and the first physical address of the memory resource 216.

Figure 7:
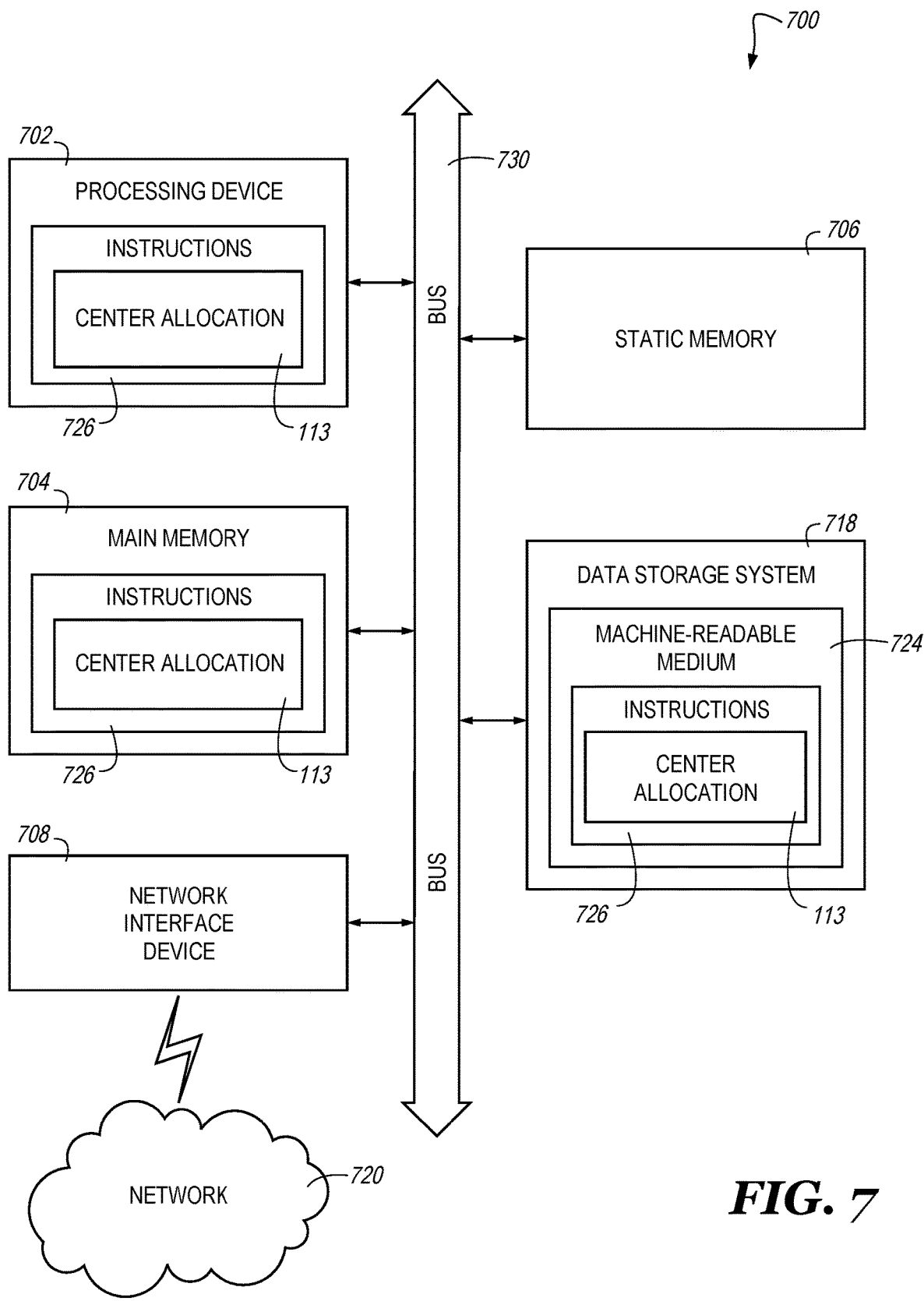
FIG. 7 is a block diagram of an example computer system in which embodiments of the present disclosure may operate.

In another non-limiting example, a non-transitory computer-readable storage medium (e.g., the machine-readable medium 724 illustrated in FIG. 7, herein) comprises instructions (e.g., the instructions 726 illustrated in FIG. 7, herein) that, when executed by a processing device (e.g., the center allocation circuitry 213 and/or the processing device 702 illustrated in FIG. 7, herein), cause the processing device to write, to a memory resource 216 coupled to the processing device, a first data entry to an address location 218 that is substantially equidistant between a first physical address 218-1 of the memory resource and a last physical address 218-N of the memory resource 216. The processing device can then (1) write, to the memory resource, a second data entry to an address location 218 that is physically located between the first physical address of the memory resource and the address location to which the first data entry is written when the second data entry has a value that is less than a value of the first data entry or (2) write, to the memory resource 216, the second data entry to an address location 218 that is physically located between the address location to which the first data entry is written and the last physical address of the memory resource 216 when the second data entry has a value that is greater than the value of the first data entry.

Continuing with this non-limiting example, the instructions can be further executed by the processing device to determine that the second data entry has the value that is less than the value of the first data entry and (1) write, to the memory resource 216, a third data entry to an address location 218 that is physically located between the first physical address of the memory resource 216 and the address location to which the second data entry is written when the third data entry has a value that is less than the second data entry or (2) write, to the memory resource 216, the third data entry to an address location that is physically located between the address location to an address location 218 that is physically located between the address location to which the first data entry is written and the address location to which the second data entry is written when the third data entry has a value that is greater than the second data entry.

Embodiments are not so limited, and in some embodiments, the instructions can be further executed by the processing device to determine that the second data entry has the value that is greater than the value of the first data entry and (1) write, to the memory resource 216, a third data entry to an address location 218 that is physically located between the address location to which the first data entry is written and the address location to which the second data entry is written when the third data entry has a value that is less than the second data entry or (2) write, to the memory resource 216, a third data entry to an address location 218 that is physically located between the address location to which the second data entry is written and the last physical address of the memory resource 216 when the third data entry has a value that is greater than the second data entry.

As described in more detail, herein the instructions can be further executed by the processing device to cause the processing device to write the first data entry, the second data entry, or one or more subsequent data entries, or any combination thereof, to the memory resource in a data structure 232. For example, the instructions can be further executed by the processing device to cause the processing device to write the first data entry, the second data entry, or one or more subsequent data entries, or any combination thereof, to the memory resource as part of an operation to write logical-physical mapping information associated with a memory sub-system 210 in which the memory resource 216 is deployed.

In some embodiments, the instructions can be further executed by the processing device to cause the processing device to receive a command to locate a particular data entry that has been written to the memory resource 216. In such examples, the particular data entry can be one of the first data entry, the second data entry, or a subsequently written data entry that is stored within the memory resource 216. The instructions can further be executed by the processing device to cause the processing device to perform a binary search involving each data entry that has been written to the memory resource 216 to locate the particular data entry.

FIGS. 3A-3H illustrate an example of a series of operations that can be performed utilizing a center allocation data structure 332 in accordance with some embodiments of the present disclosure. In the non-limiting example illustrated in FIGS. 3A-3E, a series 322 (e.g., a vector) of data entries [51, 7, 300, 12, 3] are written to address locations 318-1, 318-2, 318-3, 318-4, 318-5, 318-6, 318-7, 318-8 to 318-9 of a memory resource 316. In the non-limiting example illustrated in FIGS. 3F-3H, data entries are written to the memory resource 316 subsequent to the series 322 of data entries being written to the memory resource 316 to illustrate how the center allocation data structure 322 of the present disclosure handles several scenarios that can occur subsequent to the series 322 of data entries being written to the memory resource 316.

In the non-limiting example illustrated in FIGS. 3A-3H, the data entries are organized in the center allocation data structure 332 such that the data entries are ordered in an ascending order from data entries that have a lowest numerical value to data entries that have a highest numerical value (e.g., data entries having lower numerical data values than previously written data entries are written to address locations that are closer to the first physical address while data entries having higher numerical data values than previously written data entries are generally written to address locations that are closer to the last physical address). It will however be appreciated that embodiments are contemplated in which the data entries are organized in the center allocation data structure 332 such that the data entries are ordered in a descending order from data entries that have a highest numerical value to data entries that have a lowest numerical value. It will further be appreciated that the non-limiting example shown in FIGS. 3A-3H is merely illustrative and is provided to clarify operations that can be performed using the center allocation data structure 322 of the present disclosure. Accordingly, embodiments are not limited to the particular non-limiting example illustrated in FIGS. 3A-3H.

The memory resource can be analogous to the memory resource 218 illustrated in FIG. 2, herein and the address locations 318 can be analogous to the address locations 218 illustrated in FIG. 2, herein. Accordingly, the address location 318-1 can be referred to as a "first physical address," a "zeroth address location," or a "lowermost physical location" of the memory resource 316, while the address location 318-9 can be referred to as a "last physical address," an "$N^{th}$ address location," or an "uppermost physical location" of the memory resource 316. In the example illustrated in FIGS. 3A-3H, the address location 318-5 represents an address location that is at the center of the address space (e.g., the address space 235 illustrated in FIG. 2, herein) and can be referred to as an address location of the memory device that is substantially physically equidistant from the first physical address 318-1 of the memory resource 316 and the last physical address 318-9 of the memory resource 316.

Figure 3A:
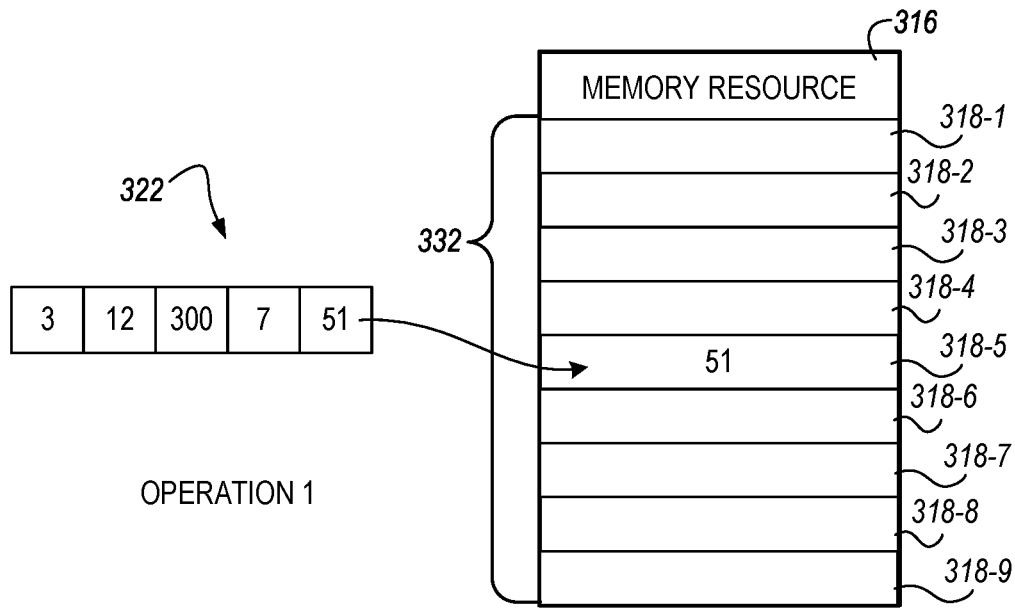
FIGS. 3A-3H illustrate an example of a series of operations that can be performed utilizing a center allocation data structure in accordance with some embodiments of the present disclosure.

In FIG. 3A, a first operation is performed to write the first data entry (51) to the memory resource 316. The first operation (as well as the subsequent operations described in connection with FIGS. 3A-3H) can be controlled by a processing device (e.g., the center allocation circuitry 113/213 illustrated in FIG. 1 and FIG. 2, herein and/or the processor 117 illustrated in FIG. 1, herein). The first data entry (51) is written to an address location (e.g., the address location 318-5) of the memory resource 316 that is neither a first physical address (e.g., the address location 318-1) of the memory resource 316 nor a last physical address (e.g., the address location 318-9) of the memory resource 316.

Figure 3B:
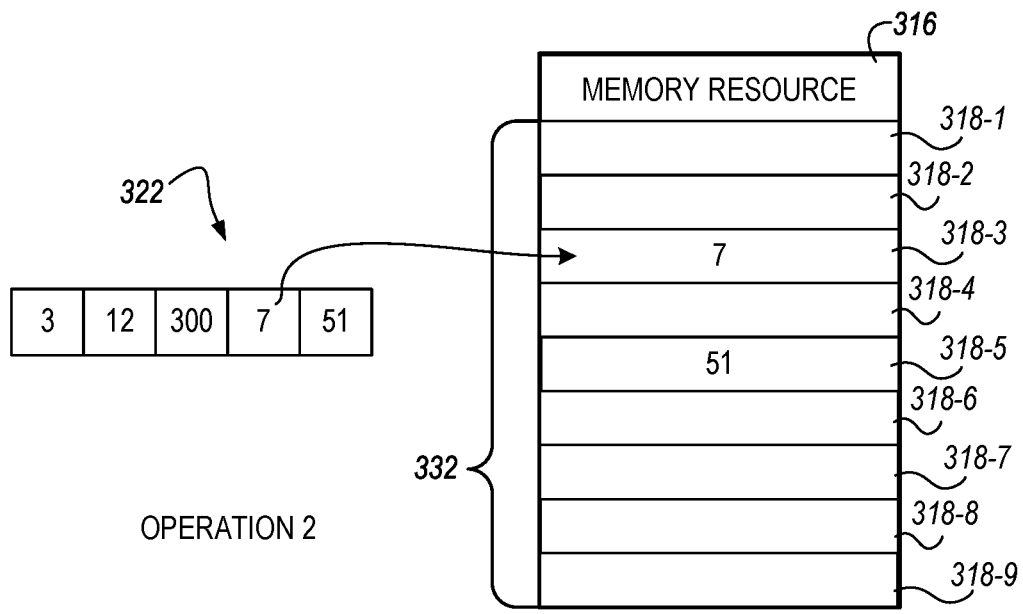

In FIG. 3B, a second operation is performed to write the second data entry (7), which has a lower numerical value than the first data entry (51), to the memory resource 316. As shown in FIG. 3B, the second data entry is written to an address location that is between the first physical address of the memory resource 316 and the address location to which the first data entry was written. Although not explicitly shown in FIG. 3B, in some embodiments, the second entry can be written to an address location that is immediately next to (e.g., the address location 318-4) the address location to which the first data entry is written.

Figure 3C:
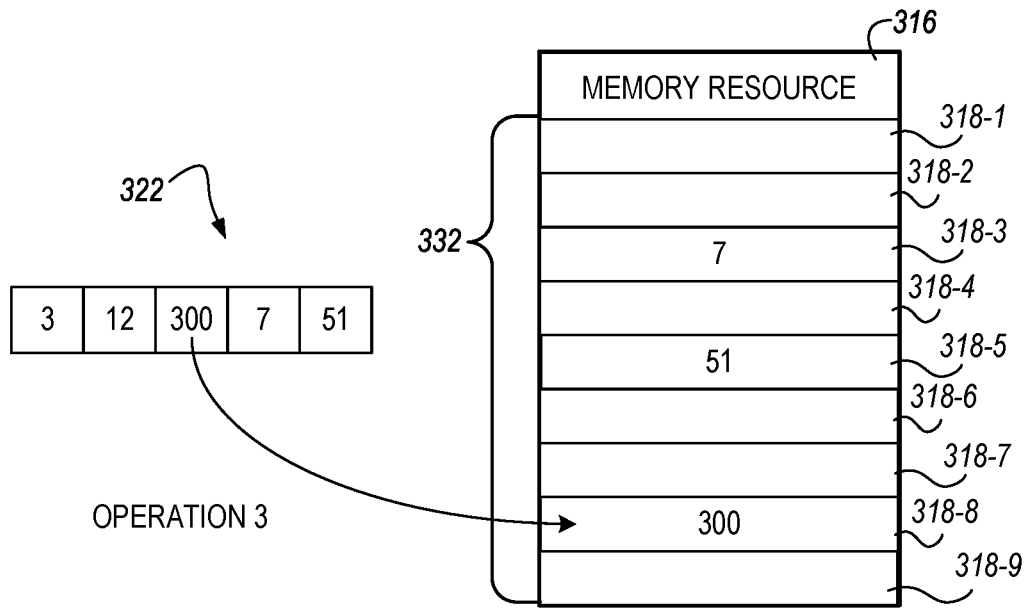

In FIG. 3C, a third operation is performed to write the third data entry (300), which has a higher numerical value than the first data entry (51), to the memory resource 316. As shown in FIG. 3C, the third data entry is written to an address location that is between the last physical address of the memory resource 316 and the address location to which the first data entry was written. Although not explicitly shown in FIG. 3C, in some embodiments, the second entry can be written to an address location that is immediately next to (e.g., the address location 318-6) the address location to which the first data entry is written.

Figure 3D:
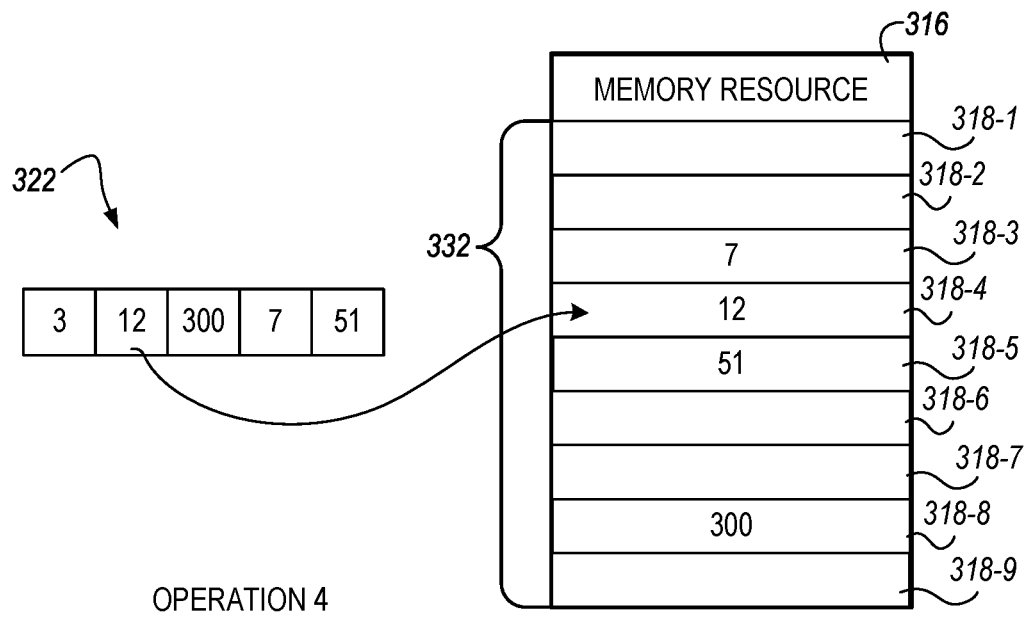

In FIG. 3D, a fourth operation is performed to write the fourth data entry (12), which has a higher numerical value than the second data entry (7) but a lower numerical value than the first data entry (51), to the memory resource 316. As shown in FIG. 3D, the fourth data entry is written to an address location that is between the address location to which the second data entry was written and the address location to which the first data entry was written. Although not explicitly shown in FIG. 3D, in some embodiments, the second data entry can be shifted (e.g., from the address location 318-4 to the address location 318-3 in embodiments in which the second data entry was written to the address location that is immediately next to the address location to which the first data entry is written to allow for the fourth data entry to be written to the address location 318-4). In such embodiments, however, even though the second data entry is shifted from one address location to another, an overall quantity of shifting operations within the memory resource 316 is reduced in comparison to the conventional approaches described above.

Figure 3E:
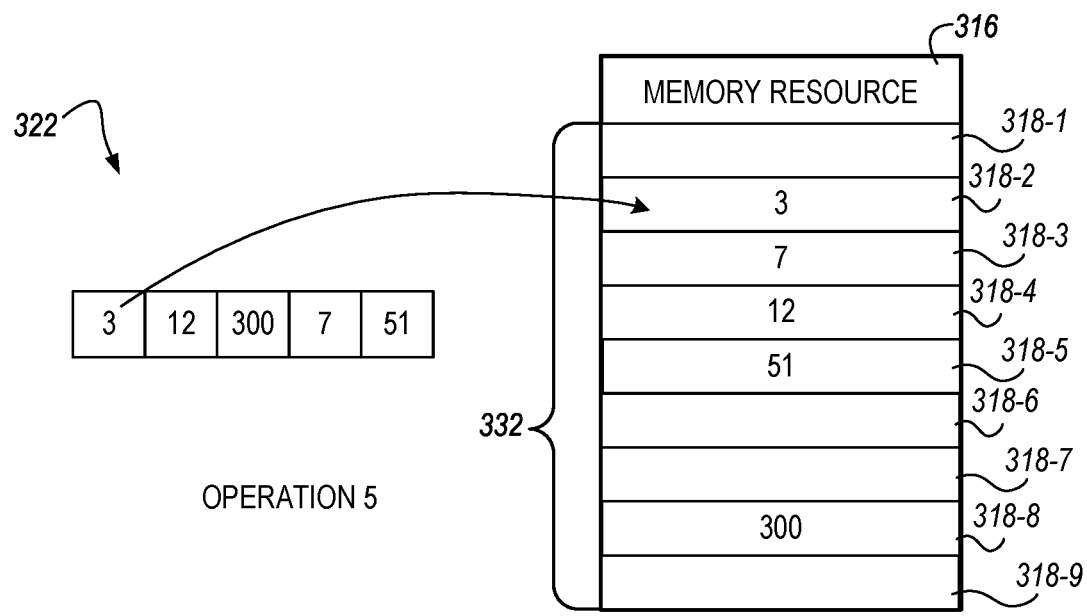

In FIG. 3E, a fifth operation is performed to write the fifth data entry (3), which has a lower numerical value than any of the previously written data entries, to the memory resource 316. As shown in FIG. 3E, the fifth data entry is written to an address location that is between the first physical address of the memory resource 316 and the address location to which the second data entry (which has the next largest numerical value) was written. In this manner, subsequent data entries can be written to the memory resource 316 while the data entries are maintained in the center allocation data structure 322 in an ordered manner.

Figure 3F:
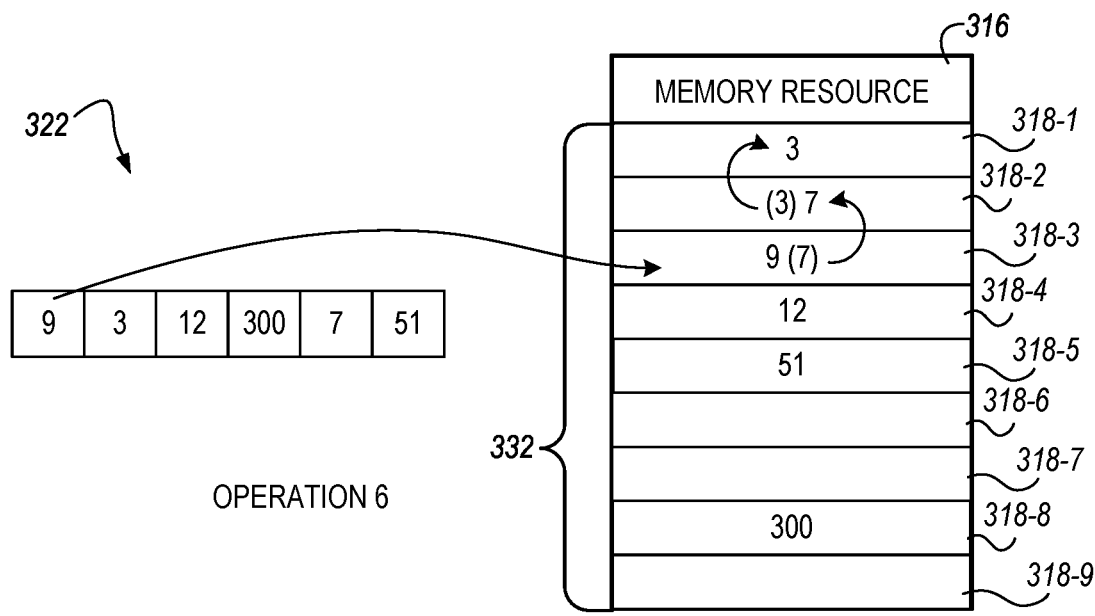
Figure 3G:
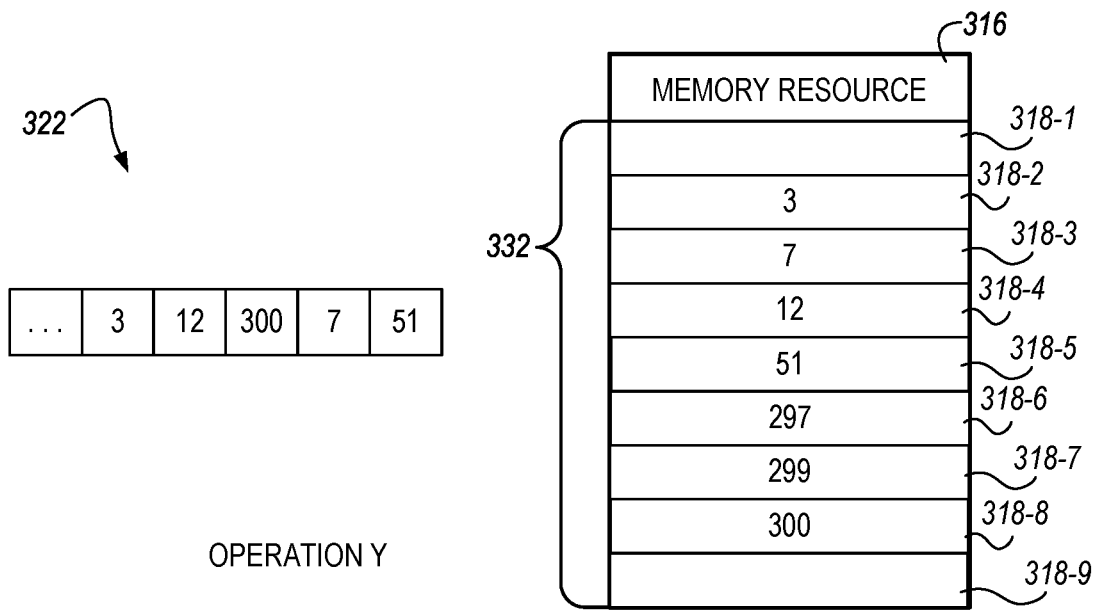

Continuing with this non-limiting example, FIG. 3F illustrates a scenario in which a sixth data entry (9) is written to the memory resource 316 after the first five data entries described in connection with FIGS. 3A-3E were written to the memory resource 316. The sixth data entry has a value that should come between the second data entry (7) and the fourth data entry (12); however, when the sixth data entry is ready to be written to the memory resource 316 there is not an available address location between the second data entry and the fourth data entry to write the sixth data entry to while preserving the ordered nature of the center allocated data structure 332. In this scenario, the fifth data entry (3) and the second data entry (7) are shifted toward the first physical address of the memory resource in order to open an address location (e.g., in order to open the address location 318-3) in which to write the sixth data entry (9). The process of shifting multiple data entries in order to open an address space for a subsequent data entry having a numerical value that lies between a group of data entries that are written to sequential address locations in the memory device 316 is referred to herein as a "batch shift operation" or a "batch shift" for brevity. Another scenario in which a batch shift operation can be performed is described below in connection with FIGS. 3F-3H.

Figure 3H:
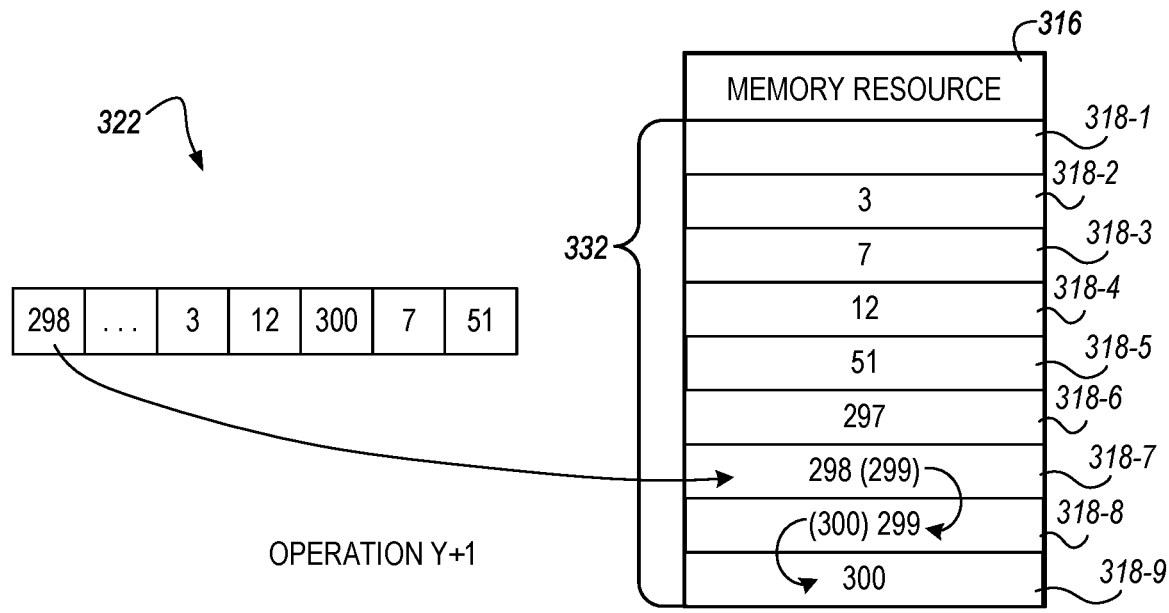

FIG. 3F illustrates the memory resource 316 and center allocation data structure 332 at a point in time after a $Y^{th}$ operation has been performed to write data entries to the memory resource 316 and the upper portion (e.g., the address locations above the address location to which the first data entry was written) are nearly full. Subsequently, as shown in FIGS. 3H, a $Y+1^{th}$ operation is performed to write a data entry (298) to the memory resource 316. In order to write the data entry (298) to the memory resource 316 while maintaining the center allocation data structure 332 in an ordered manner, a batch shift operation involving the data entry (300) and the data entry (299) is performed to shift the data entry (300) from the address location 318-8 to the address location 318-9 (the last physical address in this non-limiting example) and to shift the data entry (299) from the address location 318-7 to the address location 318-8. This batch shift operation opens the address location 318-7, and, as shown in FIG. 3H, the data entry (298) is written to the address location 318-7, thereby maintaining the ordered nature of the center allocation data structure 332.

Although not explicitly shown in FIGS. 3A-3H, if a data entry that has a higher (or lower) value than the largest (or smallest) data entry written to the data structure 332, the contents of the data structure 332 can be shifted accordingly to free up an address location to write the data entry to. For example, if, when the data structure is filled as illustrated in FIG. 3I1, a subsequent data entry arrives that has a greater value than any of the data entries in the data structure 332 (e.g., a data entry with a value of (305)), the contents of the data structure 332 can be shifted toward the first physical address 318-1 to allow for the data entry (305) to be written to the data structure 332. That is, the data entry (3) can be shifted to the address location 318-1, the data entry (7) can be shifted to the address location 318-2, the data entry (12) can be shifted to the address location 318-3, the data entry (51) can be shifted to the address location 318-4, the data entry (297) can be shifted to the address location 318-5, the data entry (298) can be shifted to the address location 318-6, the data entry (299) can be shifted to the address location 318-7, and the data entry (300) can be shifted to the address location 318-8. The new data entry (305) can then be written to the address location 318-9. It will be appreciated that similar operations can be performed in the event that a data entry has a value that is lower than the other data values in the data structure 332 is received when data values are written to the lowermost physical location of the data structure 332.

One of the main advantages of maintaining the ordered nature of the center allocation data structure 332 is to allow for utilization of binary searching (which is also referred to as logarithmic searching) in order to locate specific data entries within the center allocation data structure 332. As will be appreciated, binary searching is a technique in which a search interval used to search for particular entries in a sorted (e.g., ordered) data structure is repeatedly divided in half. This technique allows for minimization of search queries in an ordered data structure as the search interval generally converges rapidly to locate the particular data entry.

Figure 4:
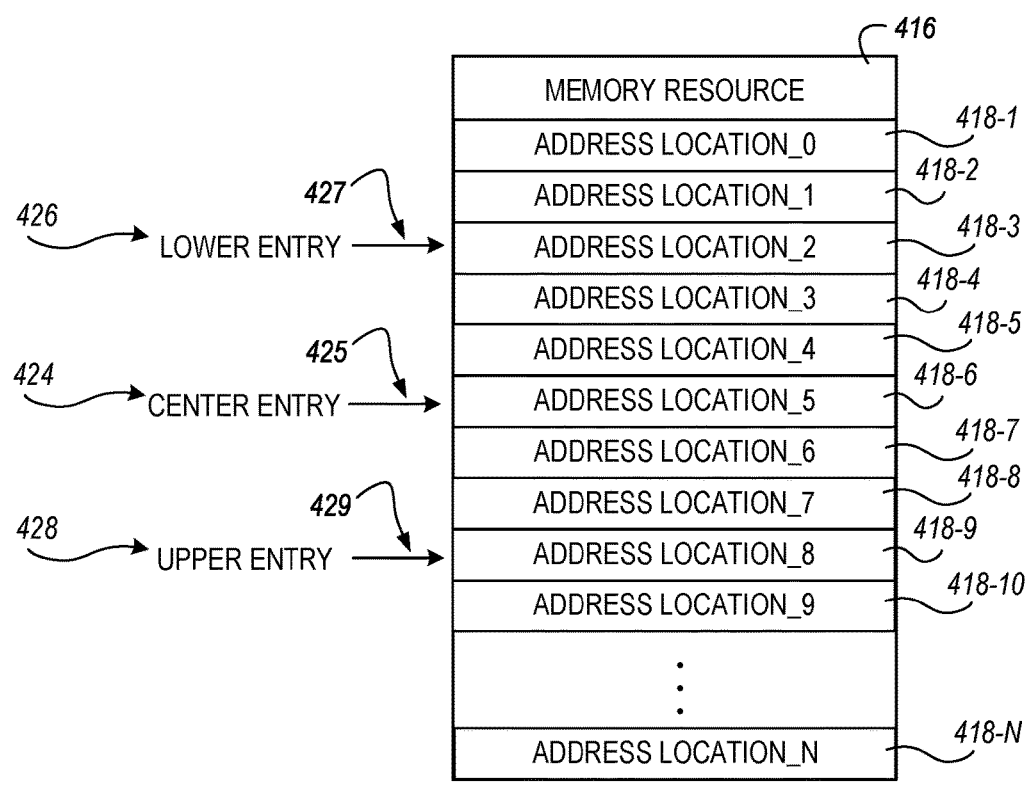
FIG. 4 illustrates an example of a memory resource having a plurality of address locations in accordance with some embodiments of the present disclosure.

FIG. 4 illustrates an example of a memory resource 416 having a plurality of address locations 418-1 to 418-N in accordance with some embodiments of the present disclosure. The memory resource 416 can be analogous to the memory resource 216/316 illustrated in FIG. 2 and FIGS. 3A-3H, herein, and the address locations can be analogous to the address locations 218/318 illustrated in FIG. 2 and FIGS. 3A-3H, herein. In FIG. 4, a center entry 424, a lower entry 426, and an upper entry 428 are illustrated. Each of these entries corresponds to a data entry that has been written to the memory resource 416 and has a respective pointer 425, 427, and 429 associated therewith.

For example, the center entry 424 can correspond to a first data entry that is written to the memory resource 416, e.g., a data entry that is written to an address location, in this case the address location 418-6, that is equidistant from a first physical address 418-1 and a last physical address 418-N. The pointer 425 can be assigned to this address location to indicate where the center data entry is written in the memory resource 416.

The lower pointer 427 can be assigned to an address location in which the lower entry 426, e.g., the data entry that, for an ordered ascending data structure (e.g., the data structure 232 illustrated in FIG. 2 and/or the center allocation data structure 332 illustrated in FIGS. 3A-3H, herein) has a lowest value and is therefore physically closest to the first physical address 418-1, is written. Similarly, the upper pointer 429 can be assigned to an address location in which the upper entry 428, e.g., the data entry that, for an ordered ascending data structure has a highest value and is therefore physically closest to the last physical address 418-N, is written.

The pointers 425, 427, and 429 can be dynamically moved as the memory resource is filled with data entries. For example, the pointer 425 can be moved to align with the center entry 424 (e.g., with the data entry that is equidistant from the upper entry 426 and the lower entry 428), while the lower pointer 427 and the upper pointer 429 can, for an ordered ascending data structure, be moved to align with the data entry that has the lowest numerical value and the data entry that has the highest numerical value, respectively. It will be appreciated that, for an ordered descending data structure, the lower pointer 427 and the upper pointer 429 can be moved to align with the data entry that has the lowest numerical value and the data entry that has the highest numerical value, respectively.

The pointers 425, 427, and 429 can be used in connection with determining an address location 418 in the data structure to write data entries. For example, the pointer 427 can be checked to determine a numerical value of a data entry written to the address location associated with the lower entry 426 to determine if a data entry that is to be written to the memory resource 416 has a greater numerical value or a lesser numerical value than the value of the data entry written to the address location associated with the lower entry 426. If the numerical value of the data entry that is to be written to the memory resource 416 is less than the numerical value of the data entry written to the address location associated with the lower entry 426, the data entry that is to be written to the memory resource 416 can be written to an address location that is physically closer to the first physical address of the memory resource (for an ordered ascending data structure) and the pointer 427 can be moved to point to the newly written data entry.

Similarly, the pointer 429 can be checked to determine a numerical value of a data entry written to the address location associated with the upper entry 428 to determine if a data entry that is to be written to the memory resource 416 has a greater numerical value or a lesser numerical value than the value of the data entry written to the address location associated with the upper entry 428. If the numerical value of the data entry that is to be written to the memory resource 416 is greater than the numerical value of the data entry written to the address location associated with the upper entry 428, the data entry that is to be written to the memory resource 416 can be written to an address location that is physically closer to the last physical address of the memory resource (for an ordered ascending data structure) and the pointer 429 can be moved to point to the newly written data entry.

Figure 5A:
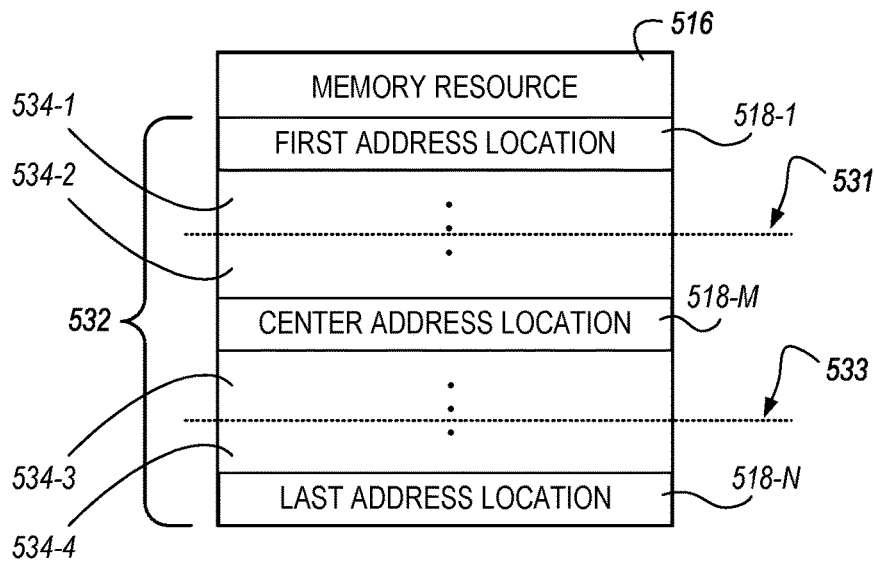
FIGS. 5A-5B illustrate additional examples of a memory resource having a plurality of address locations in accordance with some embodiments of the present disclosure.
Figure 5B:
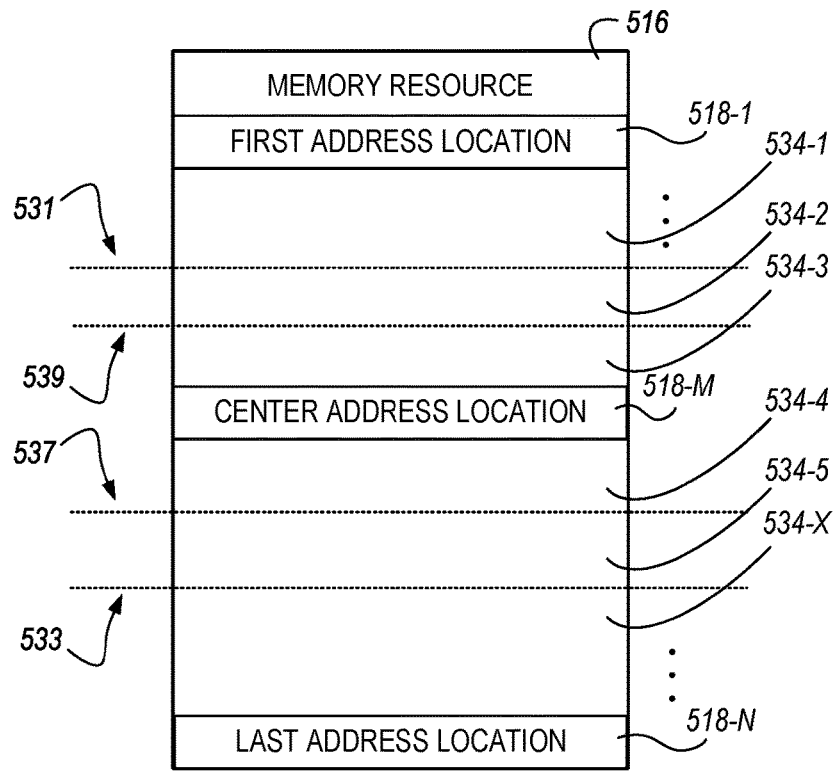

FIGS. 5A-5B illustrate additional examples of a memory resource 516 having a plurality of address locations 518-1 to 518-N in accordance with some embodiments of the present disclosure. The memory resource 516 can be analogous to the memory resource 216/316/416 illustrated in FIG. 2, FIGS. 3A-3H, and FIGS. 4A-4B, herein, and the address locations can be analogous to the address locations 218/318 illustrated in FIG. 2, FIGS. 3A-3H, and FIGS. 4A-4B, herein. The examples illustrated in FIGS. 5A-5B show various ways in which the data structure 532 of the memory resource 516 can be divided either as part of performing operations, such as the operations illustrated in FIGS. 3A-3H, to write data entries to the memory resource 516 and/or as part of performing a binary search operation to retrieve a particular data entry from the memory resource 516.

The center address location 518-M corresponds to a physical address location that is substantially equidistant from the first physical address 518-1 and the last physical address 518-N. As discussed in connection with FIG. 4, above, the physical address location that contains a data entry that has a numerical value that is in the middle of all the numerical values can move or shift over time as the memory resource 516 is filled with data entries, however, the physical address location corresponding to the center address location 518-M remains fixed. The first physical address 518-1 and the last physical address 518-N, however, remain fixed as will be appreciated (the pointers discussed in connection with FIG. 4, remain dynamic and can be moved or shifted as discussed in connection with FIG. 4).

In FIG. 5A, an address space (e.g., the address space 235 illustrated in FIG. 2, herein) of the memory resource 516 is divided into a plurality of addressable memory zones 534-1, 534-2, 534-3, and 534-4. As shown in FIG. 5A, these divisions are made between the dashed lines 531 and 533. In some embodiments, the dashed line 531 represents a physical location in the memory resource 516 that is substantially equidistant from the center address location 518-M and the first address location 518-1. Similarly, the dashed line 533 represents a physical location in the memory resource 516 that is substantially equidistant from the center address location 518-M and the last address location 518-N.

In some embodiments, data entries that are written to the memory resource 516 subsequent to writing of a first data entry that is written to the center address location 518-M can be written to one of the addressable memory zones 534-1, 534-2, 534-3, and 534-4 based on whether the data entry has a value is greater than or less than a value of the data entry that is written to the center address location 518-M. Further, as described above in connection with FIGS. 3A-3H, each subsequent data entry can be written to one of the addressable memory zones 534-1, 534-2, 534-3, and 534-4 based on the relative values of the data entries written to the memory resource 516.

In addition to, or in the alternative, the addressable memory zones 534-1, 534-2, 534-3, and 534-4 can correspond to zones (e.g., sections) of the memory resource 516 that are searched as part of a binary searching operation to locate and/or retrieve a particular data entry from the memory resource 516. For example, is a particular data entry is requested, the memory resource 516 can be divided into multiple addressable memory zones 534-1, 534-2, 534-3, and 534-4 to facilitate performance of a binary searching operation.

In FIG. 5B, the address space (e.g., the address space 235 illustrated in FIG. 2, herein) of the memory resource 516 is divided into a plurality of addressable memory zones 534-1, 534-2, 534-3, 534-4, 534-5 to 535-X. As shown in FIG. 5A, these divisions are made between the dashed lines 531, 539, 533, and 537 to further divide the memory resource 516 into a greater quantity of addressable memory zones 534-1 to 534-X than are shown in FIG. 5A. In some embodiments, the dashed line 531 represents a physical location in the memory resource 516 that is substantially equidistant from the center address location 518-M and a physical address that is substantially equidistant between the first address location 518-1 and the center address location 518-M. Similarly, the dashed line 533 represents a physical location in the memory resource 516 that is substantially equidistant from the center address location 518-M and a physical address that is substantially equidistant between the last address location 518-N and the center address location 518-M. The dashed lines 537 and 539 can represent physical locations in the memory resource 516 that are substantially equidistant between the dashed lines 531 and 533, respectively, and the center address location 518-M. It will be appreciated that the memory resource 516 can be further divided into additional addressable memory zones 534 that are not explicitly illustrated in FIGS. 5A-5B.

As discussed above in connection with FIG. 5A, the addressable memory zones 534-1 to 534-X can correspond to regions of the memory resource 516 to which data entries are written over time as the memory resource 516 is filled with data entries. In addition to, or in the alternative, the addressable memory zones 534-1 to 534-X can correspond to zones (e.g., sections) of the memory resource 516 that are searched as part of a binary searching operation to locate and/or retrieve a particular data entry from the memory resource 516.

Figure 6:
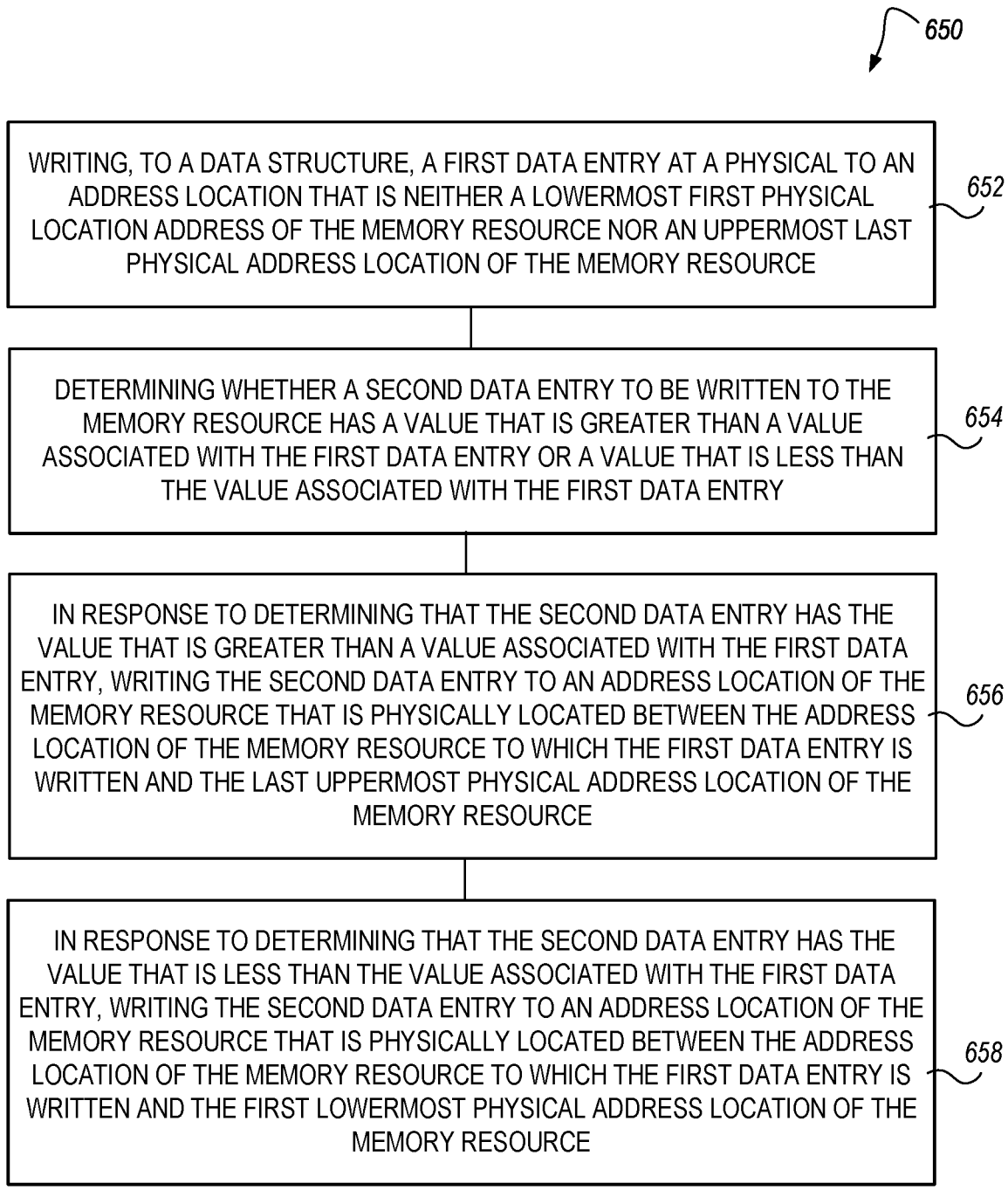
FIG. 6 is a flow diagram corresponding to a method for a center allocation data structure in accordance with some embodiments of the present disclosure.

FIG. 6 is a flow diagram corresponding to a method 650 for a center allocation data structure in accordance with some embodiments of the present disclosure. The method 650 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 650 is performed by the center allocation circuitry 113 of FIG. 1 and/or the center allocation circuitry 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 652, the method 650 includes writing, to a data structure (e.g., the data structure 232 illustrated in FIG. 2 and/or the center allocation data structure 332 illustrated in FIGS. 3A-3H, herein), a first data entry at a physical location that is neither a lowermost physical location (e.g., the first physical address) of a memory resource (e.g., the memory resource 216/316/416/516 illustrated in FIGS. 2, 3A-3H, 4, and 5A-5B, herein) nor an uppermost physical location (e.g., the last physical address) of the memory resource. As discussed above, writing the first data entry to the address location that is neither the lowermost physical location of the memory resource nor the uppermost physical location of the memory resource can include writing the first data entry to an address location in the memory resource that is substantially equidistant from the lowermost physical location of the memory resource and the uppermost physical location of the memory resource.

At operation 654, the method 650 includes determining whether a second data entry to be written to the memory resource has a value that is greater than a value associated with the first data entry or a value that is less than the value associated with the first data entry.

At operation 656, the method 650 includes in response to determining that the second data entry has the value that is greater than a value associated with the first data entry, writing the second data entry to an address location of the memory resource that is physically located between the address location of the memory resource to which the first data entry is written and the uppermost physical location of the memory resource.

At operation 658, the method 650 includes in response to determining that the second data entry has the value that is less than the value associated with the first data entry, writing the second data entry to an address location of the memory resource that is physically located between the address location of the memory resource to which the first data entry is written and the lowermost physical location of the memory resource.

The method 650 can further include determining that a third data entry to be written to the memory resource has a value that is less than the value associated with the first data entry and greater than the second data entry and writing the third data entry to a physical address within the second addressable memory zone in response to the determination or the method 650 can include determining that a third data entry to be written to the memory resource has a value that is greater than the value associated with the second data entry and writing the third data entry to a physical address within the fourth addressable memory zone in response to the determination.

Embodiments are not so limited, however, and the method 650 can include determining that a third data entry to be written to the memory resource has a value that is greater than the value associated with the first data entry and less than the second data entry and writing the third data entry to a physical address within the third addressable memory zone in response to the determination or the method can include determining that a third data entry to be written to the memory resource has a value that is less than the value associated with the first data entry and greater than the second data entry and writing the third data entry to a physical address within the second addressable memory zone in response to the determination.

As described in connection with FIGS. 5A-5B, the method 650 can include dividing an address space (e.g., the address space 235 illustrated in FIG. 2, herein) associated with the memory resource into a plurality of addressable memory zones (e.g., the addressable memory zones 534 illustrated in FIGS. 5A-5B, herein). For example, the address space associated with the memory resource can be divided into a first addressable memory zone contains physical address locations of the memory resource that are between the lowermost physical location of the memory resource and an address that demarcates a midway point between the lowermost physical location of the memory resource and an address location in the memory resource that is substantially equidistant from the lowermost physical location of the memory resource and the uppermost physical location of the memory resource.

The address space associated with the memory resource can be further divided into a second addressable memory zone contains physical address locations of the memory resource that are between the address that demarcates the midway point between the lowermost physical location of the memory resource and the address location in the memory resource that is substantially equidistant from the lowermost physical location of the memory resource and the uppermost physical location of the memory resource, a third addressable memory zone contains physical address locations of the memory resource that are between the address location in the memory resource that is substantially equidistant from the lowermost physical location of the memory resource and the uppermost physical location of the memory resource and an address that demarcates the midway point between the uppermost physical location of the memory resource and the address location in the memory resource that is substantially equidistant from the lowermost physical location of the memory resource and the uppermost physical location of the memory resource, and a fourth addressable memory zone contains physical address locations of the memory resource that are between the address location in the memory resource that demarcates the midway point between the uppermost physical location of the memory resource and the address location in the memory resource that is substantially equidistant from the lowermost physical location of the memory resource and the uppermost physical location of the memory resource and the uppermost physical location of the memory resource. As discussed above, the address space of the memory resource can be divided into fewer or additional memory zones as needed based on the quantity of data entries that are stored within the memory device.

FIG. 7 is a block diagram of an example computer system in which embodiments of the present disclosure may operate. For example, FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the center allocation circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to center allocation circuitry (e.g., the center allocation circuitry 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
  a memory resource; and
  a processing device coupled to the memory resource, wherein the processing device is configured to:
    write a first data entry to an address location of the memory resource that is neither a first physical address of the memory resource nor a last physical address of the memory resource;
    determine whether a second data entry to be written to the memory resource has a value that is greater than a value of the first data entry or a value that is less than the value of the first data entry; and
    in response to a determination that the second data entry has the value that is greater than a value of the first data entry, write the second data entry to an address location of the memory resource that is physically located between the address location of the memory resource to which the first data entry is written and the last physical address of the memory resource; or
    in response to a determination that the second data entry has the value that is less than the value of the first data entry, write the second data entry to an address location of the memory resource that is physically located between the address location of the memory resource to which the first data entry is written and the first physical address of the memory resource.

2. The apparatus of claim 1, wherein the processing device is configured to:
   determine whether a third data entry to be written to the memory resource:
      has a value that is greater than a value of the first data entry or a value that is less than the value of the first data entry; and
      has a value that is greater than the value of the second data entry or a value that is less than the value of the second data entry; and
   in response to a determination that the third data entry has the value that is greater than a value of the first data entry and the value that is greater than the second data entry, write the third data entry to an address location of the memory resource that is physically located between the address location of the memory resource to which the second data entry is written and the last physical address of the memory resource; or
   in response to a determination that the third data entry has the value that is less than the value of the first data entry and the value that is less than the second data entry, write the third data entry to an address location of the memory resource that is physically located between the address location of the memory resource to which the first data entry is written and the first physical address of the memory resource.

3. The apparatus of claim 1, wherein:
   the memory resource comprises N address locations, and
   the first physical address is a zeroth address location of the memory resource and the last address location is an $N^{th}$ address location of the memory resource, or
   the first physical address is the $N^{th}$ address location of the memory resource and the last address location is the zeroth address location of the memory resource.

4. The apparatus of claim 1, wherein the memory resource is configured to store the data entries in a data structure.

5. The apparatus of claim 1, wherein the data entries comprise logical-to-physical mapping entries associated with a memory sub-system in which the memory resource is deployed.

6. The apparatus of claim 1, wherein the processing device is configured to write the first data entry to the address location of the memory resource that is neither the first physical address of the memory resource nor the last physical address of the memory resource by writing the data entry to an address location of the memory resource that is substantially physically equidistant from the first physical address of the memory resource and the last physical address of the memory resource.

7. The apparatus of claim 1, wherein the processing device is further configured to:
   generate a first pointer corresponding to a physical address that includes a data entry that is physically closest to the first physical address of the memory resource;
   generate a second pointer corresponding to a physical address that includes a data entry that is physically closest to the last physical address of the memory resource; and
   maintain the first pointer and the second pointer for subsequent data entries to the memory resource.

8. The apparatus of claim 1, wherein the processing device is further configured to:
   for a subsequent data entry, determine an address location that is substantially equidistant from a previous data entry having a lowest value and a previous data entry having a highest value that is less than a value of a data entry that is written to a physical address that is substantially equidistant from the first address location and the last address location of the memory resource; and
   write the subsequent data entry to the address location that is substantially equidistant from the previous data entry having the lowest value and the previous data entry having the highest value that is less than the value of the data entry that is written to the physical address that is substantially equidistant from the first address location and the last address location of the memory resource.

9. The apparatus of claim 1, wherein the processing device is further configured to:
   for a subsequent data entry, determine an address location that is substantially equidistant from a previous data entry having a lowest value and a previous data entry having a highest value that is greater than a value of a data entry that is written to a physical address that is substantially equidistant from the first address location and the last address location of the memory resource; and
   write the subsequent data entry to the address location that is substantially equidistant from the previous data entry having the lowest value and the previous data entry having the highest value that is greater than the value of the data entry that is written to the physical address that is substantially equidistant from the first address location and the last address location of the memory resource.

10. The apparatus of claim 1, wherein the apparatus comprises a system-on-chip.

11. A method, comprising:
    writing, to a data structure, a first data entry at a physical location that is neither a lowermost physical location of a memory resource nor an uppermost physical location of the memory resource;
    determining whether a second data entry to be written to the memory resource has a value that is greater than a value of the first data entry or a value that is less than the value of the first data entry; and
    in response to determining that the second data entry has the value that is greater than a value of the first data entry, writing the second data entry to an address location of the memory resource that is physically located between the address location of the memory resource to which the first data entry is written and the uppermost physical location of the memory resource; or
    in response to determining that the second data entry has the value that is less than the value of the first data entry, writing the second data entry to an address location of the memory resource that is physically located between the address location of the memory resource to which the first data entry is written and the lowermost physical location of the memory resource.

12. The method of claim 11, further comprising writing the first data entry to the address location that is neither the lowermost physical location of the memory resource nor the uppermost physical location of the memory resource by writing the first data entry to an address location in the memory resource that is substantially equidistant from the lowermost physical location of the memory resource and the uppermost physical location of the memory resource.

13. The method of claim 11, further comprising:
dividing an address space associated with the memory resource into a plurality of addressable memory zones, wherein:
a first addressable memory zone contains physical address locations of the memory resource that are between the lowermost physical location of the memory resource and an address that demarcates a midway point between the lowermost physical location of the memory resource and an address location in the memory resource that is substantially equidistant from the lowermost physical location of the memory resource and the uppermost physical location of the memory resource,
a second addressable memory zone contains physical address locations of the memory resource that are between the address that demarcates the midway point between the lowermost physical location of the memory resource and the address location in the memory resource that is substantially equidistant from the lowermost physical location of the memory resource and the uppermost physical location of the memory resource,
a third addressable memory zone contains physical address locations of the memory resource that are between the address location in the memory resource that is substantially equidistant from the lowermost physical location of the memory resource and the uppermost physical location of the memory resource and an address that demarcates the midway point between the uppermost physical location of the memory resource and the address location in the memory resource that is substantially equidistant from the lowermost physical location of the memory resource and the uppermost physical location of the memory resource, and
a fourth addressable memory zone contains physical address locations of the memory resource that are between the address location in the memory resource that demarcates the midway point between the uppermost physical location of the memory resource and the address location in the memory resource that is substantially equidistant from the lowermost physical location of the memory resource and the uppermost physical location of the memory resource and the uppermost physical location of the memory resource.

14. The method of claim 13, further comprising:
determining that a third data entry to be written to the memory resource has a value that is less than the value of the second data entry; and
writing the third data entry to a physical address within the first addressable memory zone in response to the determination.

15. The method of claim 13, further comprising:
determining that a third data entry to be written to the memory resource has a value that is less than the value of the first data entry and greater than the second data entry; and
writing the third data entry to a physical address within the second addressable memory zone in response to the determination.

16. The method of claim 13, further comprising:
determining that a third data entry to be written to the memory resource has a value that is greater than the value of the first data entry and less than the second data entry; and
writing the third data entry to a physical address within the third addressable memory zone in response to the determination.

17. The method of claim 13, further comprising:
determining that a third data entry to be written to the memory resource has a value that is greater than the value of the second data entry; and
writing the third data entry to a physical address within the fourth addressable memory zone in response to the determination.

18. A non-transitory computer-readable storage medium comprising instructions that, when executed by a processing device, cause the processing device to:
write, to a memory resource coupled to the processing device, a first data entry to an address location that is substantially equidistant between a first physical address of the memory resource and a last physical address of the memory resource;
write, to the memory resource, a second data entry to:
an address location that is physically located between the first physical address of the memory resource and the address location to which the first data entry is written when the second data entry has a value that is less than a value of the first data entry, or
an address location that is physically located between the address location to which the first data entry is written and the last physical address of the memory resource when the second data entry has a value that is greater than the value of the first data entry.

19. The non-transitory computer-readable storage medium of claim 18, further comprising instructions that, when executed by the processing device, cause the processing device to:
determine that the second data entry has the value that is less than the value of the first data entry; and
write, to the memory resource, a third data entry to:
an address location that is physically located between the first physical address of the memory resource and the address location to which the second data entry is written when the third data entry has a value that is less than the second data entry, or
an address location that is physically located between the address location to which the first data entry is written and the address location to which the second data entry is written when the third data entry has a value that is greater than the second data entry.

20. The non-transitory computer-readable storage medium of claim 18, further comprising instructions that, when executed by the processing device, cause the processing device to:
determine that the second data entry has the value that is greater than the value of the first data entry; and
write, to the memory resource, a third data entry to:
an address location that is physically located between the address location to which the first data entry is written and the address location to which the second data entry is written when the third data entry has a value that is less than the second data entry, or
an address location that is physically located between the address location to which the second data entry is written and the last physical address of the memory resource when the third data entry has a value that is greater than the second data entry.

21. The non-transitory computer-readable storage medium of claim 18, further comprising instructions that, when executed by the processing device, cause the processing device to write the first data entry, the second data entry, or one or more subsequent data entries, or any combination thereof, to the memory resource in a data structure.

22. The non-transitory computer-readable storage medium of claim 18, further comprising instructions that, when executed by the processing device, cause the processing device to write the first data entry, the second data entry, or one or more subsequent data entries, or any combination thereof, to the memory resource as part of an operation to write logical-physical mapping information associated with a memory sub-system in which the memory resource is deployed.

23. The non-transitory computer-readable storage medium of claim 18, further comprising instructions that, when executed by the processing device, cause the processing device to:
- receive a command to locate a particular data entry that has been written to the memory resource, wherein the particular data entry is one of the first data entry, the second data entry, or a subsequently written data entry; and
- perform a binary search involving each data entry that has been written to the memory resource to locate the particular data entry.

* * * * *